United States Patent
Smith et al.

(10) Patent No.: US 9,149,808 B1
(45) Date of Patent: Oct. 6, 2015

(54) BALL AND SOCKET VALVE FOR A FLUID CONTAINER

(76) Inventors: Jeffrey P. Smith, San Diego, CA (US); David W. Dietterle, Oceanside, CA (US)

(*) Notice: Subject to any disclaimer, the term of this patent is extended or adjusted under 35 U.S.C. 154(b) by 1181 days.

(21) Appl. No.: 13/066,512

(22) Filed: Apr. 15, 2011

Related U.S. Application Data

(63) Continuation-in-part of application No. 12/924,197, filed on Sep. 21, 2010, now abandoned, which is a continuation-in-part of application No. 11/897,503, filed on Aug. 30, 2007.

(51) Int. Cl.
- *B65D 47/20* (2006.01)
- *B01L 3/00* (2006.01)
- *F16K 5/06* (2006.01)

(52) U.S. Cl.
CPC ............. *B01L 3/50825* (2013.01); *B65D 47/20* (2013.01); *F16K 5/0605* (2013.01); *F16K 5/0636* (2013.01); *F16K 5/0647* (2013.01)

(58) Field of Classification Search
CPC .... B01L 3/50825; B65D 47/20; B65D 47/30; B65D 47/04; F16K 5/06; F16K 5/0605; F16K 5/0626; F16K 5/0636; F16K 5/0647
USPC ................. 251/315.01–315.16; 215/312–313; 222/548, 554, 556; 141/301
See application file for complete search history.

(56) References Cited

U.S. PATENT DOCUMENTS

| | | | | |
|---|---|---|---|---|
| 133,215 | A * | 11/1872 | Endicott | 251/257 |
| 1,726,642 | A * | 9/1929 | Betts | 222/545 |
| 2,030,696 | A * | 2/1936 | Forster | 222/542 |
| 2,127,465 | A * | 8/1938 | Church | 222/554 |
| 2,209,050 | A * | 7/1940 | Church | 222/556 |
| 2,805,801 | A * | 9/1957 | Jacobs et al. | 222/548 |
| 2,990,980 | A * | 7/1961 | Gronemeyer | 222/536 |
| 3,690,521 | A * | 9/1972 | Middleton et al. | 222/507 |
| 3,703,249 | A * | 11/1972 | Middleton | 222/507 |
| 3,703,250 | A * | 11/1972 | Middleton | 222/507 |
| 6,032,813 | A * | 3/2000 | Niermann et al. | 215/312 |
| 6,705,482 | B2 * | 3/2004 | Savitz et al. | 222/554 |
| 7,165,568 | B2 * | 1/2007 | Kessell et al. | 251/317.01 |
| 2007/0045313 | A1 * | 3/2007 | Holcomb et al. | 215/313 |
| 2010/0243939 | A1 * | 9/2010 | Lin | 251/315.06 |

* cited by examiner

*Primary Examiner* — John Bastianelli

(57) ABSTRACT

In a ball and socket closure for opening and closing an intake port for a hollow fluid container including bicycle mounted bottles such as water or other kind of fluids which refreshes the user or provides nourishment, The ball and socket closure may be used on water bottles or adaptors for sports water bottles used in place of the original bottle cap, Such original bottle caps have no quick fill capability or a selectively open and closed ball and socket intake cap as is in the present invention, which permits introduction of water through the cavity within a spherical ball valve, received by a cylindrical socket for supporting the ball in an intake port of the fluid container. A tab on the edge of the hole in the ball permits manipulation of the ball between an open and a closed position as required by the user.

1 Claim, 2 Drawing Sheets

BALL AND SOCKET VALVE FOR A FLUID CONTAINER

CROSS-REFERENCE TO RELATED APPLICATIONS

This application is a Continuation in Part of non-provisional U.S. application Ser. No. 12/924,197 filed Sep. 21, 2010, which is a continuation of non-provisional U.S. application Ser. No. 11/897,503 filed Aug. 30, 2007, Each of the above referenced applications is incorporated herein by reference as though fully set forth. The applicants hereby claim the priority benefit of the referenced non-provisional U.S. Applications as set forth above under 35 USC §120. Such prior applications described an invention disclosed in the manner provided by the first paragraph of 35 USC §112 which are still pending. The named inventors in this application were named in such prior applications.

A Patent Cooperation Treaty (PCT) application based on the U.S. application described above was filed on Aug. 30, 2008 in the U.S. Receiving office and assigned serial number PCT/US08/09809 and has since expired. An initial review and opinion was issued.

A European Patent Office (EPO) application based on the PCT application set forth above was filed prior to expiration of the PCT application effective Aug. 15, 2008 as EPO 08 795 390.7 and is presently pending before the European Patent Office having a priority date of Aug. 30, 2007.

BACKGROUND OF THE INVENTION (1) Field of the Invention

This invention relates to a closure system for a fluid hydration system adaptor for converting a typical sports bottle or other hydration container to a quick fill fluid hydration system for bicycle riding. Although described herein as a bicycle hydration system, it may be used in relation to any other conveyance and on any suitable fluid container. More specifically, this invention relates to an closure for a fluid container which permits rapid introduction of fluid into typical water bottles or other fluid containers using a closable intake port, which may temporarily secure the fluid source in the intake port, or which be poured in to the adaptor. An alternate apparatus is included in the intake port which and prevents fluid from splashing or leaking out of the intake port when the intake port is disposed at significant angles from horizontal.

(2) Description of Related Art

There are numerous examples of related art as typified by the following patents:

U.S. Pat. No. 6,920,899 issued Jul. 26, 2005, issued to Haenlein et al, entitled: FLUID CONTROL VALVE shows a fluid control valve for controlling the delivery of water and includes a control lever attached to a spherical ball that is movable in two directions by rotation of the lever about two independent axes. No fluid flow appears to pass through the ball. The fluid control valve instead includes a separate valve body assembly with flow passageways and a housing assembly attached to the valve body assembly to define an interior space while the present invention requires flow through the spherical ball U.S. Pat. No. 3,930,636, issued Jan. 6, 1976 to, Pugh entitled: BALL VALVES shows a Ball Valve which is described as having a passage through the ball and further that as shown in the drawing, the ball valve comprises a valve housing 1 having a bore 2 in which a ball 3 is located. The ball has a flow passage 4 there through and is rotatable about a vertical axis by a spindle 5 to open and close the valve. At each side of the ball, the ball engages a correspondingly shaped end face 6 of a seat engaging ring 7, which may be made from plastics material, for example Polytetrafluoroethylene, and which is located in a recess 8 formed by a counter-bore in the bore 2. It is not clear from this patent as to how the device operates or where the end of the passage is.

At best this patent describes a passage through the ball of a control valve which can be found in any hardware store. However, there is no indication of the structure of the current invention for receiving fluids into a container from other containers and sources and then releasable sealing the intake port.

BRIEF SUMMARY OF INVENTION

The present invention comprises a ball and socket closure for selectively opening and closing an intake port for a hollow fluid container including bicycle mounted bottles having a cavity or a reservoir for receiving fluids, such as water, but may be any other kind of fluids which refreshes the user or provides nourishment, reasonably necessary to refresh the user. The ball and socket closure or valve may be used on water bottles or adaptors for typical sports water bottles in place of the original bottle cap, Such original bottle caps have no quick fill capability or include a selectively operated open and closed ball and socket valve for receiving fluid as is provided in the present invention.

By way of example the ball and socket valve will be discussed with reference to the adaptor from which this application is the continuation in part. The adaptor is attached to a sports bottle or other type of hydration container, which is mounted to a bicycle frame on aerodynamic bars 21 or other parts of the structure using a bracket 22 as shown in FIG. 1 or other mounting structure as is known in the art.

It should be noted that the current invention is described in one exemplary embodiment. The selectively operated ball and socket valve permits introduction of fluid and sealing of the fluid in the container and may apply to any particular embodiment and is not intended to be limited to the adaptor or the specific valve structure shown.

The adaptor on the bottle includes an intake port which is disposed at an angle to the longitudinal axis of the adaptor to provide a quick fill capability and includes the selectively operable ball and socket valve which the operator may operate while underway.

When the adaptor is mounted on a horizontal surface, the angle of the intake port to the horizontal will change when the rider traverses a hill. In such a case the water or other fluid can pour out of the intake port either when traveling uphill or downhill or wen the intake port position is changed for any reason such as when an accident occurs or the bicycle with the hydration bottle simply falls over.

The present invention includes the ball and socket valve described above placed in the intake tube or opening of a container. This allows the rider to selectively operate the valve to either an open position to receive water or other fluids which pass through the interior of the ball and to a closed position to prevent any spillage.

Although a ball and socket valve is described herein as the best mode for opening and closing the Intake port of hydration systems those skilled in the art may produce other similarly operating devices which are to be included within the scope of this invention as defined in the claims whether related to bicycles or otherwise. It is intended that the scope of this invention shall be as broad as the claims will allow.

DETAILED DESCRIPTION OF THE INVENTION

There is one specific embodiment of the invention described herein. While a specific embodiment is described, it is not intended that the scope of this invention be limited to such embodiment but it is intended that the scope shall be as broad as the claims will allow.

In bicycle endurance contests and other events, it is necessary for riders to maintain hydration. This is accomplished by each rider carrying sufficient fluid to provide such hydration or by being provided with fluid along the route. Spectators, pit crews and others often provide bottles of water or other fluids to the riders or spray them with water from with hoses as they pass by. The present invention provides a way of providing fluid which can be replenished by pouring fluid into the into the intake of an adaptor for a fluid container or by insertion of a fluid dispensing apparatus such as a fluid containing bottle or hose by direct insertion into the intake port, each of which may be left in position as the rider continues on the route but which can easily be removed and discarded by the rider after the bottle is empty or the hose reaches its maximum extent and pulls out. Thereafter, the rider may close the intake port using a ball and socket valve which substantially eliminates spillage of fluid from the container.

Figure 1:
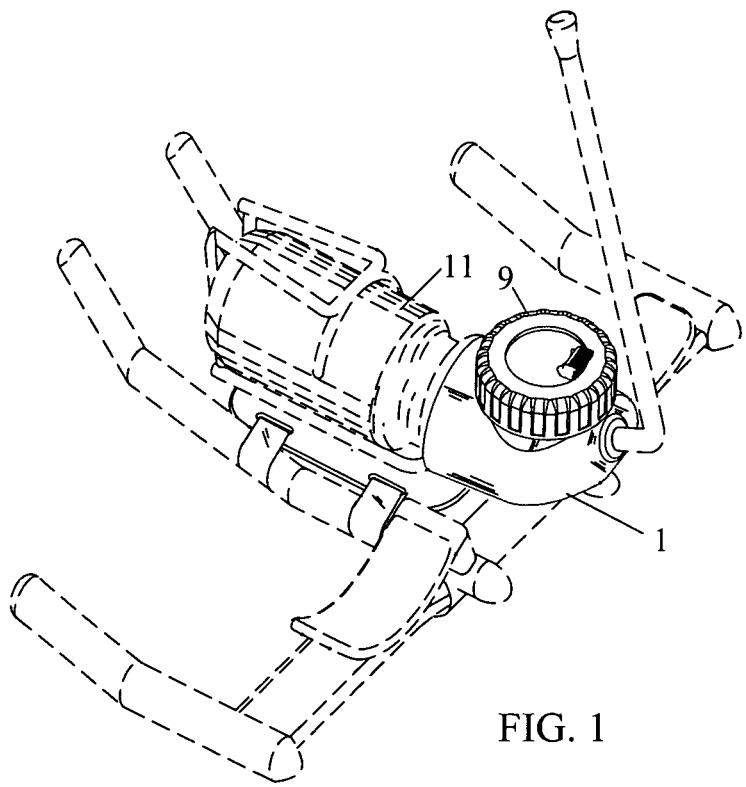
FIG. 1 is a view of a the generally horizontally disposed adaptor on a bottle mounted on the aerodynamic bars or handle bar portion of a bicycle with a horizontal platform to support the bottle and adaptor and shows the selectively operable ball and socket valve in the intake port.

In FIG. 1 an embodiment of the adaptor 1, mounted on a generally horizontal platform such as aerodynamic bars or other horizontal mounting structure. While a specific mounting structure is shown any horizontal part of the bicycle may be used a cap 9 shows the ball & socket valve in place.

Figure 2:
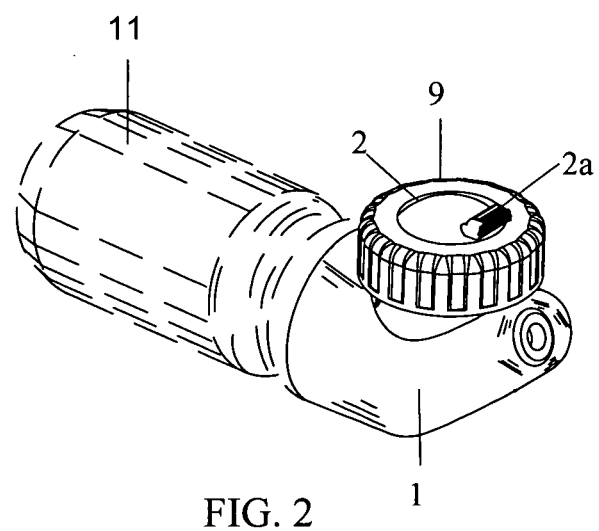
FIG. 2 is a perspective view of the generally horizontally disposed adaptor mounted on a sports bottle showing ball and socket valve in the closed position.

In FIG. 2 the adaptor 1 is shown mounted on to a sports bottle 11 or other container in perspective and shows the top of the ball and socket valve 2 with in a closed position and a tab 2a used to manipulate the between an open and closed position. The ball and socket valve is held in place with a cap 9 which is affixed to the adaptor 1.

Figure 3A:
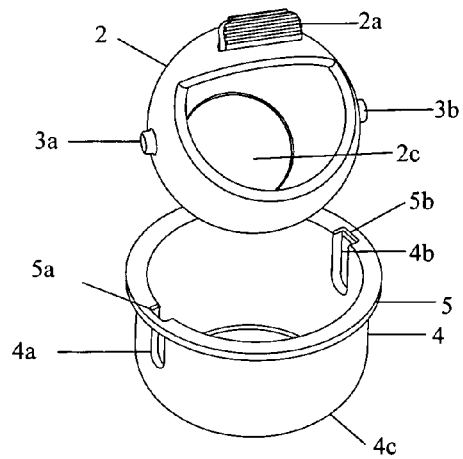
FIG. 3A is a perspective exploded view of the ball and socket of the generally horizontally disposed adaptor.

Referring now to FIG. 3A an exploded view of the ball and socket of the present invention which shows a spherical ball 2 having a circular opening 2c and a tab 2a for manipulating the spherical ball 2 is shown. The spherical ball 2 also has axles 3a and 3b on opposite sides at a central axis of the spherical ball. A cylindrical socket 4 for receiving the spherical ball 2 is also shown with an annular ring 5 affixed to the top of the cylindrical socket 4 with notches 5a and 5b for receiving the axles 3a and 3b of the spherical ball 2. The cylindrical socket 4 also has slots 4a and 4b in the sides there of which have sufficient depth to permit the axles 3a and 3b slide down the sides of the socket 4 until the sides of the spherical ball meet the annular ring 4c at the bottom of the socket 4 as shown in FIG. 3B.

Figure 3:
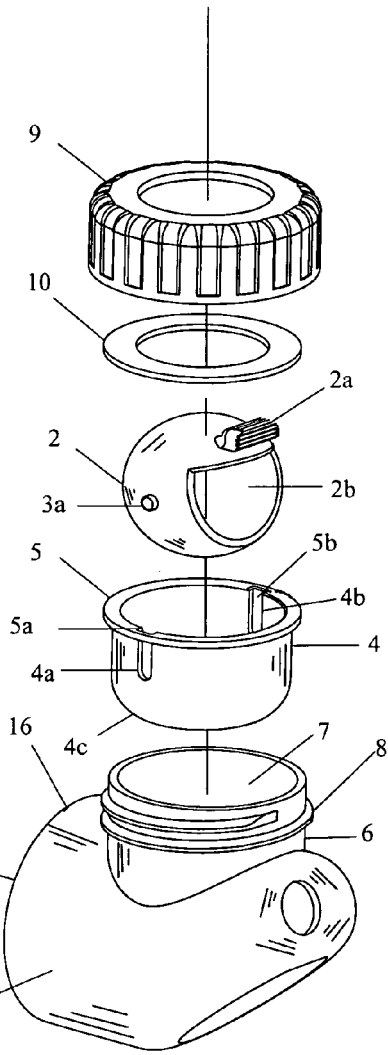
FIG. 3 is an exploded view of the generally horizontally disposed adaptor with the sports bottle and gasket disconnected from the adaptor with the cap, gasket Intake port ball and socket exploded from the intake port.
Figure 3B:
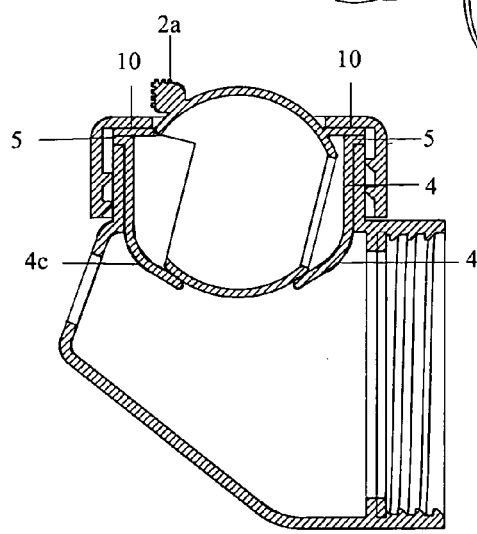
FIG. 3B is a cross sectional view the generally horizontally disposed adaptor showing the ball in the closed position within the socket.

As noted FIG. 3B also shows an annular ring 4c at the bottom of tubular socket 4 conforms to the shape of the spherical ball 2. That is the outer curvature of the spherical ball 2 conforms to the inner curvature of the annular ring 4c. The length of the sides of the socket 4 is selected so that the tab 2a of the spherical ball 2 rests against the cap 10 in either the open or closed position. Further, the cap 10 is affixed to the Intake tube 6 screw threads 8 to permit a water tight seal when the gasket 10 is resting on the annular ring 5 of cylindrical socket 4. The gasket 11 has a hole which is smaller than the hole in the cap 10 to permit a tightening or loosening of the cap 9 to compress the gasket 11 against the ball 2. This permits a water tight seal and allows tight or easy manipulation of the tab 2a of the spherical ball 2 as adjusted by the rider.

Figure 3C:
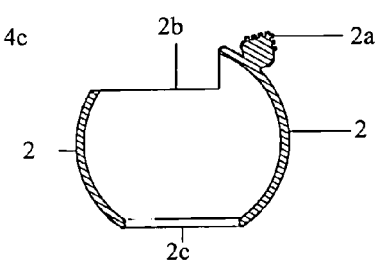
FIG. 3C is a cross sectional view of the ball disposed in a vertical open position

FIG. 3C shows the spherical ball 2a in the vertical or open position which positions the opening 2b to receive fluid or a fluid dispensing apparatus. In addition the circular hole 2c is positioned to permit any fluid entering the spherical ball to fill the container as follows in FIG. 3:

Referring to FIG. 3 an exploded view of the adaptor 1 for receiving a sports bottle 11 or other hydration container and a gasket 11a for securing the sports bottle 11 and the adaptor 1 together to prevent leakage. The adaptor 1 also has an intake tube 6 with external threads 8 for receiving a cap 9. The intake tube 6 of the adaptor 1 may be attached or made integral with the adaptor 1. FIG. 3 shows the sequence of assembly of the ball 2 and socket 4 with the adaptor 1.

The ball and socket structure shown in FIG. 3 shows the cap 9 at the top of the exploded view followed by a gasket 10 which engages the generally hollow spherical ball 2 which is shown in the closed position having a tab 2a for manipulating the spherical ball position, and the top opening 2b for receiving a fluid dispensing apparatus and a generally circular hole 2c, not shown, is opposite the opening 2b, which permits fluid introduced into the spherical ball 2 through opening 2b to exit through opening 2c into the adaptor 1 and then into the sports bottle 11 or other container. The spherical ball 2 has axles 3a and, 3b, not shown, on either side of the spherical ball 2 disposed along a central axis of the spherical ball approximately midway between the opening 2b and the circular hole 2c.

Further in FIG. 3, the cylindrical tubular socket 4 for receiving the spherical ball 2 has slotted sides 4a and 4b which engage the two axles 3a and 3b on either side of the spherical ball 2. The intake port 7 of intake tube 6 receives the generally tubular socket 4 containing the ball 2. The tubular socket 4 has an annular ridge 5 having notches 5a and 5b for receiving the axles 3a and 3b respectively of the spherical ball 2. A cap 9 secures a gasket 10 which holds the spherical ball 2 and the tubular socket 4 in place and prevents leakage when closed. In operation, the ball and socket valve of the present invention is inserted into the intake port 7 of any water container or adaptor which provides for intake of fluid and a cap 9 with a hole 9a sufficiently wide to permit rotation of the ball 2 in the socket 4 and a gasket 10 having a hole 10a which engages the ball 2. The cap 10 is tightened as desired and the tab 2a of the ball 2 is manipulated to the open post ion and the fluid or water introduced through hole 2b of the ball and after filling the tab 2a is manipulated to close the hole 2b. The water container is then ready to be used by the rider or other user.

Other Variations and modifications of the above described invention will be apparent to those skilled in the art of manufacturing fluid bottles, valves and the like. Such variations in bottle shape, intake and extraction apparatus and multiple fluids which may be used are to be included within the scope of this invention

Having thus described the invention what is claimed is:

1. An apparatus for selectively opening and closing a port comprising:
   a. a securing cap having an opening for receiving fluid and engaging said port;
   b. a gasket received by said cap with a circular opening therein;
   c. a cylindrical socket having at least two slots in the sides thereof having an annular ridge for supporting said gasket;
   d. at least one spherical ball having an open position and a closed position received in said socket having axles for engaging said slots in said socket and engaging said gasket on said annular ridge; and
   e. at least one tab mounted on said ball for selectively manipulating said ball between an open position to permit fluid entry through a channel in said ball into said port and a closed position to prevent fluid from exiting said port through said channel.

* * * * *